Figure 1:
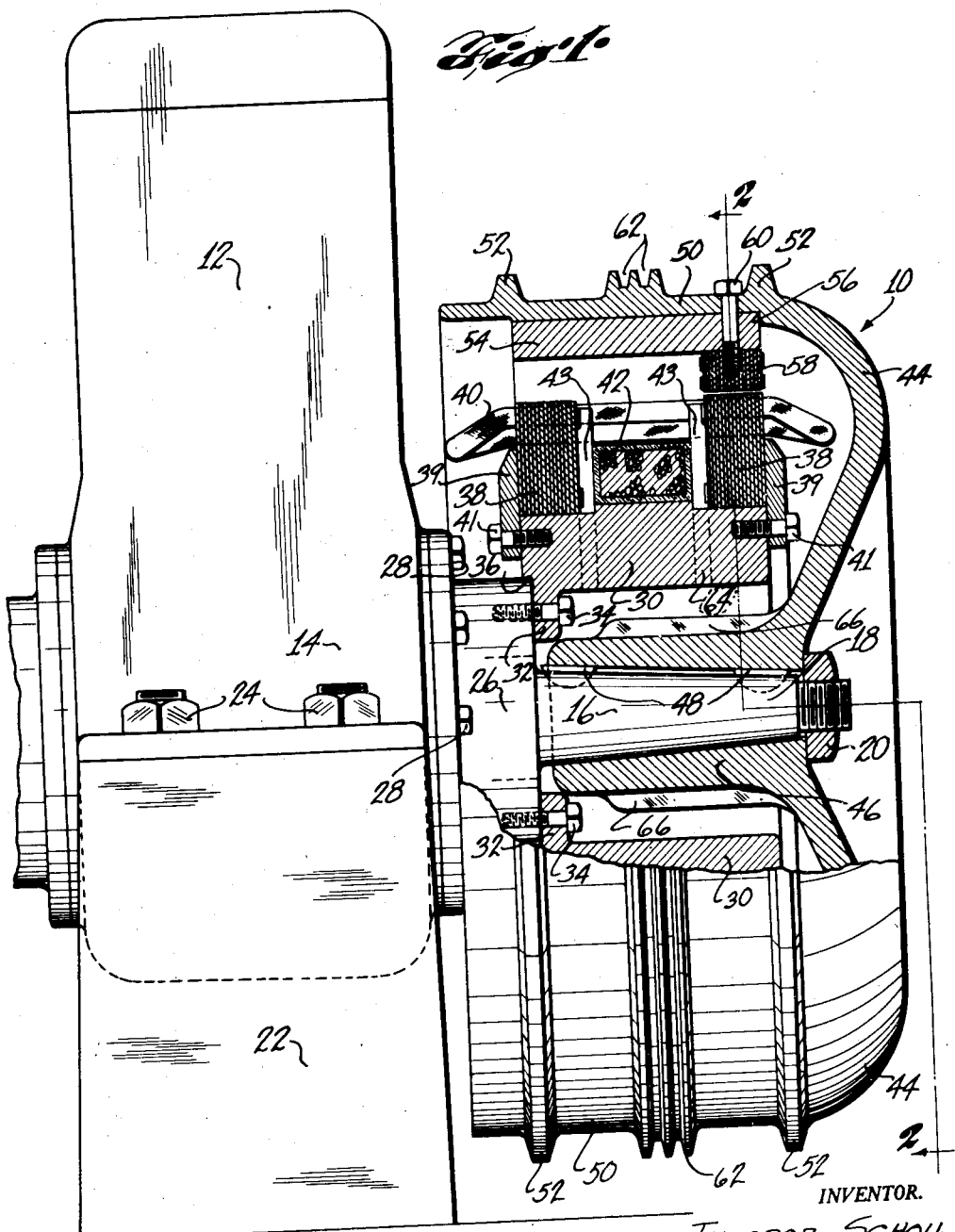

Feb. 23, 1937. T. SCHOU 2,071,953
FLYWHEEL TYPE ELECTRIC MACHINE
Filed May 4, 1933  2 Sheets-Sheet 1

INVENTOR.
THEODOR SCHOU
BY
Roy M Eilers
ATTORNEY.

Feb. 23, 1937.                T. SCHOU                2,071,953
                      FLYWHEEL TYPE ELECTRIC MACHINE
                         Filed May 4, 1933        2 Sheets-Sheet 2
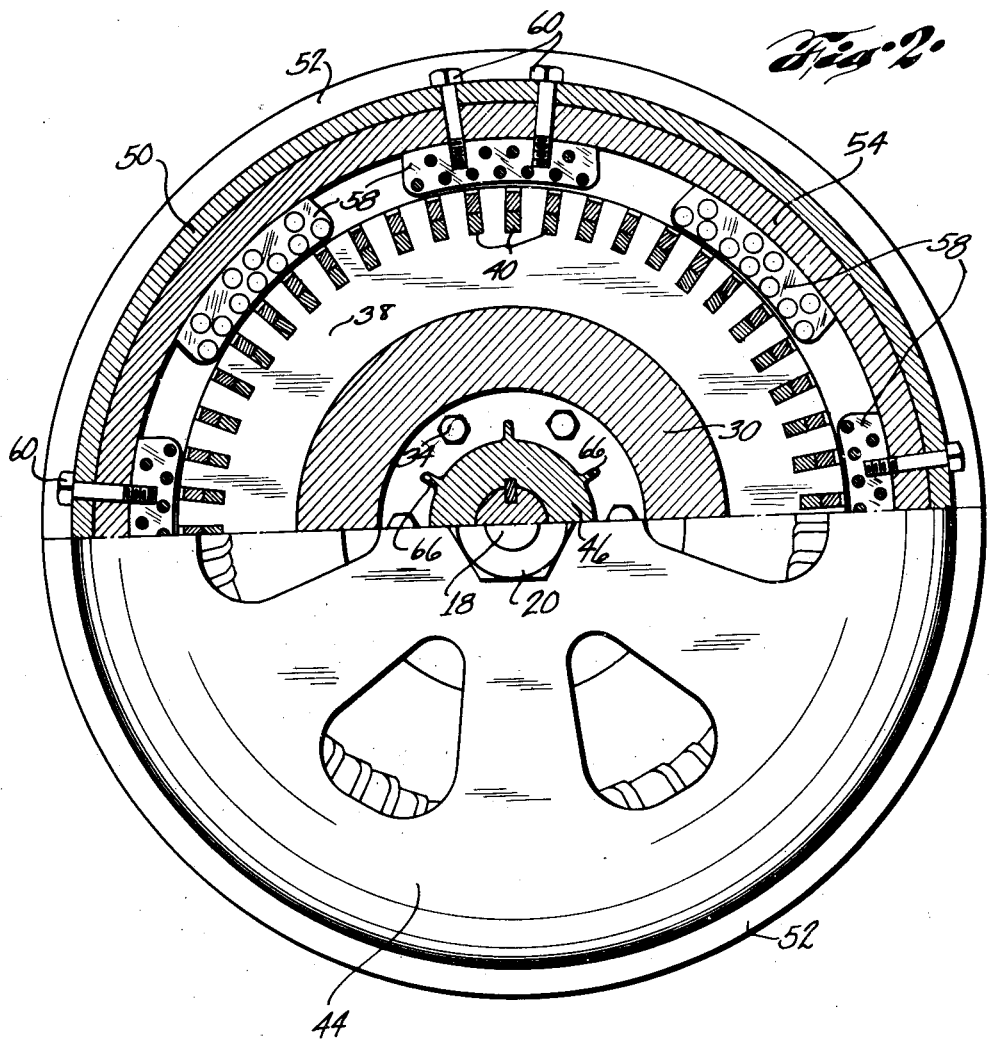
INVENTOR.
THEODOR SCHOU
BY
ATTORNEY.

Patented Feb. 23, 1937

2,071,953

UNITED STATES PATENT OFFICE 2,071,953

FLYWHEEL TYPE ELECTRIC MACHINE

Theodor Schou, Beloit, Wis., assignor to Fairbanks, Morse & Co., Chicago, Ill., a corporation of Illinois Application May 4, 1933, Serial No. 669,303

3 Claims. (Cl. 172—120)

This invention relates to electric machines of the inductor type, and more particularly to an improved machine in which the rotor and stator elements are so related in assembly as to enable the rotor structure to be employed as an inertia element or flywheel, in addition to its function as an element of an electrical machine.

An object of the present invention is attained in an improved inductor type synchronous machine, in which the rotor element is arranged for rotation externally about the stator element, whereby the rotor structure may be employed as a flywheel.

Another object is attained in an improved inductor-synchronous machine of sturdy and compact construction, in which the machine windings are, by preference, all disposed on the stator member, whereby to obviate the need for such electrical machine accessories as slip rings, brushes, and brush-supporting devices.

A further object is attained in an improved machine of the type noted, in which the rotor element supporting structure, or rotor spider is preferably formed of a suitable, non-magnetic material, as a means for substantially reducing the large magnetic leakage losses, heretofore generally prevalent in machines of inductor type.

A still further object is to provide an inductor synchronous machine which is particularly adapted to be mounted directly upon another machine, hence requiring no separate mounting base of its own. More specifically, the object is attained in an inductor synchronous machine, which may be either a generator or a motor, in which the stator structure is adapted to be secured to the frame of an internal combustion engine for example, or to a compressor, its application to such apparatus depending, of course, upon whether the synchronous machine is a motor or a generator. In either case, the rotor of the synchronous machine is adapted to provide a flywheel effect, in the operation of the machines.

Further objects and advantages will be found from the following description of a selected embodiment of the invention, and from the appended drawings, in which:

Fig. 1 is a side elevation, partly in section, of a preferred form of inductor synchronous machine, shown as applied to the shaft and frame of a companion driving or driven machine, such as an internal combustion engine, and Fig. 2 is an end elevation, partly in section, of the inductor machine, as viewed along lines 2—2 in Fig. 1.

Referring to the drawings by numerals of reference, 10 designates, generally, an inductor synchronous machine embodying improvements presently to be described. The machine 10 is illustrated as being operatively associated with a machine 12 which in the present example, may be considered as an internal combustion engine. The engine 12 includes an engine frame 14, and a drive shaft 16, which may be formed of a non-magnetic material, such as stainless steel, the shaft preferably having an outwardly tapering end portion 18, threaded say on its extreme outer end to receive a retaining nut 20 for a purpose presently appearing. The engine may be mounted upon any suitable foundation or base, such as 22, and held thereon by suitable bolts 24.

A ring mounting member 26 is formed on or detachably secured to the engine frame 14, concentrically of the shaft 16, as by suitable bolts 28. A stator ring member 30 is formed of a metal having magnetic properties, and is adapted, by means of an inwardly extending flange or shoulder portion 32, near one end of the member, partly to overlie, and to be secured to the member 26, as by screws 34 extending through the flange portion 32. The shouldered end of the member 30 is preferably axially recessed, as at 36, to receive the outer margin of the member 26, whereby to maintain the stator structure in proper axial alignment and, as later appears, serves to provide for and maintain a predetermined relation between the rotor and stator, thus obviating any variation in air gap and other adjustments. The mounting member 26 is preferably an aluminum alloy casting, although any other suitable non-magnetic material may be employed in its formation, the provision of a non-magnetic mounting member being especially desirable in order to reduce magnetic leakage to the engine frame.

Armature core elements 38 which are preferably of laminated construction, are secured in spaced relation upon the ring member 30, and are provided with an armature winding 40. A field winding 42, disposed between the core structures 38, is secured to the member 30 by any suitable means. The armature structure and field winding may be of conventional form, and hence need not be further described herein, as they form, of themselves, no part of the present invention.

A convenient expedient for assembling the stator core elements 38 to the ring member 30, is shown in the present example as consisting of a pair of annular plate-like elements 39, one thereof being secured to each end face of the member 30, as by cap screws 41. As will appear from Fig. 1, the plates 39 laterally engage the core elements, which are positioned against inward movement axially of the member 30, as by spacers 43. The spacers are preferably channeled, radially of the axis of the machine, and so provide for ventilation through the stator structure, as will hereinafter more fully appear.

A rotor frame or spider 44, substantially cup-shape in form, is provided with a hollow, internally tapered hub portion 46 adapted to engage the drive shaft end 18. The frame member is securely held on the shaft end by the retaining nut 20, which, when drawn up, binds the hub upon the tapered shaft end. Suitable shaft keys 48 may be employed to prevent any relative rotation between the spider and drive shaft. The outer cylindrical portion 50 of the rotor frame is preferably strengthened by peripheral external ribs 52.

The spider or frame member 44 is preferably formed of a non-magnetic material in order substantially to reduce the magnetic leakage which would otherwise occur through the frame, engine shaft 16, and engine frame 14. The member 44 may, for example, be formed of an aluminum alloy, although any other suitable metal or alloy having non-magnetic characteristics may be employed in the formation of the rotor frame. In addition to its non-magnetic quality, the frame member must possess sufficient mass to enable it to function as a flywheel, the flywheel operation of the rotor being one of the principal objects to be attained by the present novel rotor construction and arrangement.

A magnetic bridge or field ring 54, disposed within and along the inner surface of the cylindrical portion 50 of the rotor frame, and abutting an annular shoulder 56 adjacent the inner end of the frame section 50, carries, on its inner surface, longitudinally spaced field poles 58, which are in inductive relation to the armature core elements 38. The field poles are preferably arranged in axially staggered relation, as illustrated in Fig. 2, and are each secured to the bridge member 54 by screws 60, which preferably extend through the bridge and rotor frame portion 50. The screws extending through the ring 54 thus serve to maintain the ring or bridge in assembly, within the rotor frame. In case an aluminum alloy or other light weight material is employed in the construction of the spider 44, the desired weight or mass may be imparted to the rotor structure, to provide the desired flywheel effect, by making the ring or bridge member 54 of a sufficiently heavy material or of such portions as to impart the required weight to the rotating structure.

The field winding of a synchronous machine is generally supplied from a separate source of direct current, either from direct current mains, or from a separate generator or exciter. In those installations which employ an exciter machine, the exciter is usually mounted directly upon the main shaft. However, in the present example, it is preferred to mount the field exciter (not shown) upon a separate foundation, and to couple it with the rotor element of the synchronous machine 10 by means of a belt drive. Hence, a belt sheave 62 is provided on the central portion of the rotor frame section 50, the sheave being preferably formed integrally with the rotor frame. As shown in Fig. 1, the sheave is adapted to receive V type belt elements. However, other forms of belt drives may be employed with substantially equal effect, it being noted that by omitting the rib elements resulting in the V sheaves, the face of the rotor may be employed for receiving a flat power transmission belt, either for power take-off purposes, or for an exciter belt, or both.

Cooling is conveniently provided for by a series of radial ventilating ducts 64, in the stator ring 30, and a draft of cooling air directed therethrough by a plurality of fins or fan blades 66 disposed in spaced relation about the rotor hub section 46. It will be observed as my preference to align the ducts 64 with the channeled spacers 43, above described.

The presently improved inductor synchronous machine is particularly adapted to be secured directly to a compressor, engine, or other machine, either as a driving, or a driven unit, and hence requires no separate mounting base. In addition, the need for a separate flywheel, per se, is obviated by reason of the adaptation of the synchronous machine rotor structure to function as a flywheel.

It is to be understood, of course, that this invention is not to be limited to the present embodiment thereof, but that substantial alterations and modifications may be made therein without departing from the spirit and full intended scope of the invention, as defined by the appended claims.

I claim:

1. In an electric machine of flywheel type, a stator including an annular frame of magnetic metal, armature windings and core elements carried peripherally of said annular member, a plate detachably secured to each lateral face of the ring member, field windings intervening the core elements and carried by said ring member, a non-magnetic support for said ring member tending to confine the armature flux path to said ring member, a shaft, a rotor bracket formed of a non-magnetic metal, and secured to said shaft, a magnetic bridging structure mounted internally of the periphery of said rotor bracket, and a plurality of inductor pole pieces carried internally of said bridging structure and movable in exterior adjacence to said armature and field windings.

2. In an electrical machine of flywheel type adapted for mounting upon the frame of a machine to be driven thereby, a stationary frame arranged for supported securement to the driven machine, a non-magnetic mounting ring formed of an aluminum alloy, a shaft journalled in said frame, a stator assembly supported in overhung relation upon the mounting ring, a rotor assembly including a flywheel element of a non-magnetic aluminum alloy and having an integral spider portion detachably engaging the shaft, the machine being of inductor type and including a plurality of inductor field elements, and a supporting ring for said inductor field elements, said ring being formed of a magnetic metal and serving as a loading device internally of the periphery of the flywheel element, the magnetic elements of the stator and rotor being relatively disposed so as to define paths of substantial flux leakage extending respectively from the inductor field elements through the web of the flywheel structure and along the axis thereof, and from the stator assembly into the mounting ring therefor.

3. In an electric machine of flywheel type, stator including an annular frame of magnetic metal, armature windings and core elements, carried peripherally of said annular member, a plate detachably secured to each lateral face of the ring member, field windings intervening the core elements, and carried by said ring member, a non-magnetic support for said ring member tending to confine the armature flux path to said ring member, a shaft of non-magnetic, stainless steel, a rotor bracket formed of a non-magnetic metal, and secured to said shaft, a magnetic bridging structure mounted internally of the periphery of said rotor bracket, and a plurality of inductor pole pieces carried internally of said bridging structure and movable in exterior adjacence to said armature and field windings.

THEODOR SCHOU.